United States Patent
Yoo et al.

(10) Patent No.: US 9,366,246 B2
(45) Date of Patent: Jun. 14, 2016

(54) APPARATUS AND METHOD FOR CONTROLLING COMPRESSOR, AND REFRIGERATOR HAVING THE SAME

(71) Applicant: LG ELECTRONICS INC., Seoul (KR)

(72) Inventors: Jaeyoo Yoo, Seoul (KR); Taewoong Nah, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 591 days.

(21) Appl. No.: 13/752,563

(22) Filed: Jan. 29, 2013

(65) Prior Publication Data

US 2013/0192294 A1    Aug. 1, 2013

(30) Foreign Application Priority Data

Jan. 30, 2012  (KR) ............... 10-2012-0009082

(51) Int. Cl.
| | |
|---|---|
| *F25B 41/00* | (2006.01) |
| *F25B 27/00* | (2006.01) |
| *F25B 43/02* | (2006.01) |
| *F04B 49/02* | (2006.01) |
| *F25B 1/02* | (2006.01) |
| *F25B 1/10* | (2006.01) |

(Continued)

(52) U.S. Cl.
CPC ............. *F04B 49/02* (2013.01); *F04B 49/06* (2013.01); *F25B 1/02* (2013.01); *F25B 1/10* (2013.01); *F25B 5/02* (2013.01); *F25B 49/022* (2013.01); *F25B 2341/0661* (2013.01); *F25B 2500/19* (2013.01); *F25B 2500/26* (2013.01); *F25B 2600/021* (2013.01); *F25B 2600/024* (2013.01); *F25B 2600/23* (2013.01); *F25B 2700/151* (2013.01); *Y02B 30/741* (2013.01)

(58) Field of Classification Search
CPC ............ F04B 49/02; F04B 49/06; F25B 1/02; F25B 1/10; F25B 2500/26; F25B 2600/021; F25B 2600/024; F25B 2600/23; F25B 2700/151; F25B 49/022
USPC .................................. 62/175, 198, 236, 470
See application file for complete search history.

(56) References Cited

U.S. PATENT DOCUMENTS

| | | | | |
|---|---|---|---|---|
| 3,360,958 A | * | 1/1968 | Miner | ............... F25B 31/002 62/470 |
| 4,787,211 A | * | 11/1988 | Shaw | .................... F25B 1/10 417/248 |

(Continued)

FOREIGN PATENT DOCUMENTS

| | | |
|---|---|---|
| CN | 1858449 A | 11/2006 |
| CN | 101248314 A | 8/2008 |

(Continued)

OTHER PUBLICATIONS

Chinese Office Action dated Dec. 1, 2014, issued in Application No. 201310036723.2.

(Continued)

*Primary Examiner* — Henry Crenshaw
(74) *Attorney, Agent, or Firm* — KED & Associates, LLP

(57) ABSTRACT

A compressor control apparatus and method, and a refrigerator including the same, are provided. In a refrigerator having two compressors, starting of two compressors may be staggered to reduce an effect of the suction pressure and discharge pressure between the two compressors, to provide for stable operation of the compressors, and improve reliability and power consumption.

17 Claims, 10 Drawing Sheets

(51) Int. Cl.
*F25B 5/02* (2006.01)
*F25B 49/02* (2006.01)
*F04B 49/06* (2006.01)

(56) References Cited

U.S. PATENT DOCUMENTS

| | | | | |
|---|---|---|---|---|
| 5,050,397 | A * | 9/1991 | Sugiyama | F25B 13/00 62/158 |
| 5,103,650 | A * | 4/1992 | Jaster | F25B 1/10 62/198 |
| 5,109,678 | A * | 5/1992 | Jaster | F25B 1/10 62/175 |
| 5,235,820 | A * | 8/1993 | Radermacher | F25B 1/10 62/114 |
| 6,015,270 | A * | 1/2000 | Roth | F04B 3/00 417/259 |
| 6,382,256 | B2 * | 5/2002 | Kim | 137/870 |
| 2005/0257545 | A1 * | 11/2005 | Ziehr | B60H 1/004 62/236 |
| 2006/0090502 | A1 * | 5/2006 | Taras | F24F 3/153 62/510 |
| 2007/0144190 | A1 * | 6/2007 | Temmyo | F25D 29/00 62/180 |
| 2007/0241697 | A1 * | 10/2007 | Sung | F04B 35/045 318/135 |
| 2007/0266719 | A1 * | 11/2007 | Kang | F24F 11/001 62/228.5 |
| 2007/0283707 | A1 | 12/2007 | Hatano et al. | |
| 2008/0150456 | A1 * | 6/2008 | Heo | F25B 49/025 318/119 |
| 2010/0061127 | A1 * | 3/2010 | Katou | H02M 1/4208 363/126 |
| 2010/0086415 | A1 * | 4/2010 | Spiegl | F04B 49/243 417/53 |
| 2010/0146994 | A1 * | 6/2010 | Tomioka | F25B 13/00 62/84 |
| 2010/0218528 | A1 * | 9/2010 | Yakumaru | F25B 47/022 62/234 |
| 2010/0269527 | A1 * | 10/2010 | Thybo | F25B 5/02 62/200 |
| 2010/0326125 | A1 * | 12/2010 | Sakae | F25B 13/00 62/470 |
| 2011/0058968 | A1 * | 3/2011 | Kang | F04B 17/04 417/415 |
| 2011/0072836 | A1 * | 3/2011 | Wang | F25B 7/00 62/79 |
| 2011/0194957 | A1 * | 8/2011 | Kang | F04B 35/045 417/415 |
| 2011/0197601 | A1 * | 8/2011 | Booth | F24F 11/008 62/89 |
| 2011/0247358 | A1 * | 10/2011 | Wada | F25B 1/10 62/510 |

FOREIGN PATENT DOCUMENTS

| | | |
|---|---|---|
| CN | 100417876 C | 9/2008 |
| CN | 102257332 A | 11/2011 |
| EP | 2 381 190 A1 | 10/2011 |
| WO | WO 2008/019689 A2 | 2/2008 |

OTHER PUBLICATIONS

European Search Report dated Nov. 18, 2013 for corresponding Application No. 13153057.8.

* cited by examiner

APPARATUS AND METHOD FOR CONTROLLING COMPRESSOR, AND REFRIGERATOR HAVING THE SAME

CROSS-REFERENCE TO RELATED APPLICATION

This application claims priority under 35 U.S.C. §119 to Korean Application No. 10-2012-0009082, filed on Jan. 30, 2012, whose entire disclosure is hereby incorporated by reference.

BACKGROUND

1. Field

This relates to a compressor control apparatus and a refrigerator comprising the same.

2. Background

In general, compressors convert mechanical energy into compression energy of a fluid and may form part of a refrigerating cycle used in an appliance, such as, for example, a refrigerator, an air conditioner or the like.

Compressors may be classified into reciprocating compressors, rotary compressors, and scroll compressors. Reciprocating compressors form a compression space between a piston and a cylinder to suction or discharge a working gas, thereby compressing refrigerant while moving in a linear reciprocating manner. Rotary compressors form a compression space between an eccentrically rotated roller and a cylinder to suction or discharge a working gas, thereby compressing refrigerant while the roller is eccentrically rotated along an inner wall of the cylinder. Scroll compressors form a compression space between an orbiting scroll and a fixed scroll to suction or discharge a working gas, thereby compressing refrigerant while the orbiting scroll is rotated along the fixed scroll.

BRIEF DESCRIPTION OF THE DRAWINGS

The embodiments will be described in detail with reference to the following drawings in which like reference numerals refer to like elements wherein.

DETAILED DESCRIPTION

Figure 1:
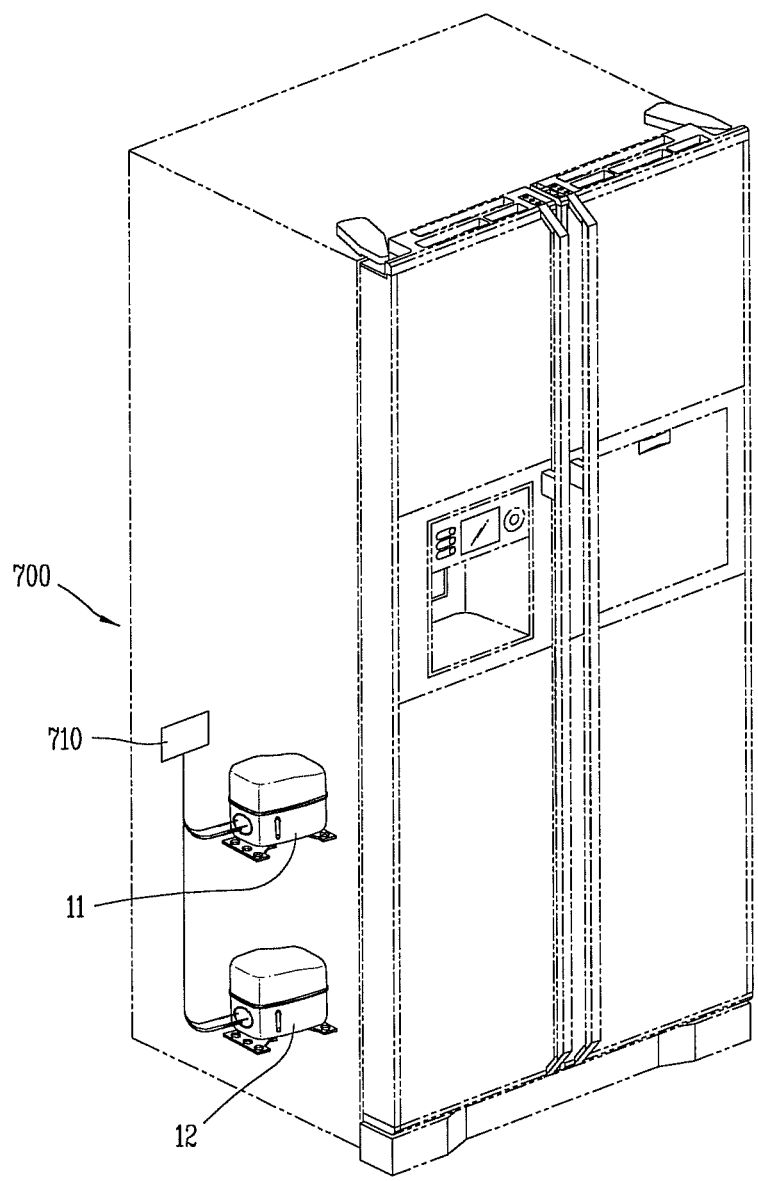
FIG. 1 is a perspective view of an exemplary refrigerator having two compressors, according to an embodiment as broadly described herein.

In reciprocating compressors, an inner piston may move in a linear reciprocating manner within the cylinder, thereby suctioning, compressing and discharging a refrigerant gas. In a recipro-type reciprocating compressor, a crank shaft may be coupled to a rotating motor and a piston may be coupled to the crank shaft, thereby converting a rotational movement into a linear reciprocating movement. In a linear-type reciprocating compressor, a piston may be connected to a linearly moving mover of the motor, thereby converting a linear movement of the motor into a reciprocating movement of the piston.

Reciprocating compressors may include a power unit for generating a driving force, and a compression unit for receiving the driving force from the power unit to compress a fluid. For example, an electric motor may be used for the power unit, and a linear motor may be used in a linear type reciprocating compressor. In a linear motor, the motor may directly generate a linear driving force, without the use of an additional mechanical conversion device, resulting in a less complicated structure. Furthermore, a linear motor may reduce loss due to energy conversion, and, without a connecting portion causing friction and abrasion, noise may be reduced. Furthermore, when a linear type reciprocating compressor (hereinafter, referred to as a "linear compressor") is used in, for example, a refrigerator or air conditioner, a stroke voltage applied to the linear compressor may be changed to change the compression ratio, thereby allowing the linear compressor to provide for variable freezing capacity control.

However, since a linear compressor may perform a reciprocating movement while the piston is not mechanically restricted in the cylinder, the piston may collide with the cylinder wall, or forward movement of the piston may be restricted due to a large load when voltage is suddenly and excessively applied, thereby causing difficulty in performing proper compression. Accordingly, a control apparatus for controlling movement of the piston corresponding to variation of a load or voltage may be considered.

A compressor control apparatus may detect voltage and current applied to the compressor motor and estimate a stroke using, for example, a sensorless method, to perform feedback control, and, may include, for example, a triac or inverter for controlling the compressor. When using an inverter, a compressor control apparatus may use that inverter to control one corresponding compressor. For example, in a refrigerator having a freezing chamber and a refrigerating chamber, two inverters may perform independent control, thereby implementing a refrigerant cycle for each chamber.

When two compressors are used in a refrigerator, operation of the two compressors may affect suction pressure and discharge pressure, and may also affect reliability of the compressor(s). In particular, in the case of a linear compressor, its installation position may be somewhat restricted within the refrigerator, possibly increasing difficulty in top dead center control.

Figure 2:
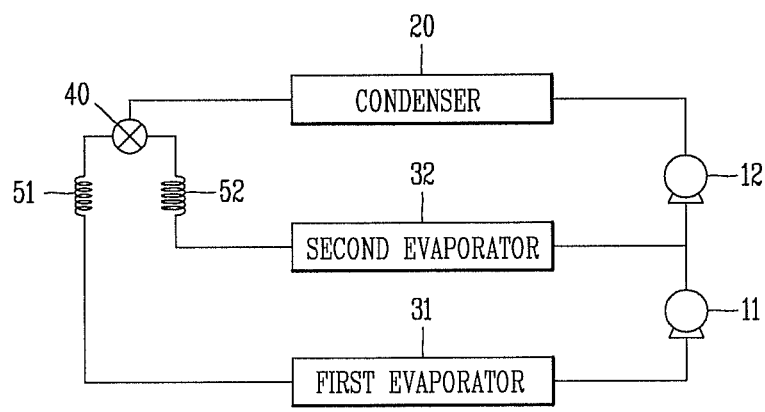
FIG. 2 is a schematic diagram of a freezing cycle applied to the refrigerator shown in FIG. 1.

Referring to FIGS. 1 and 2, a refrigerator 700 may include a first compressor 11 and a second compressor 12 connected to each other to compress refrigerant in two stages, a condenser 20 connected to a discharge side of the second compressor 12 located downstream in a refrigerant direction, a first evaporator 31 branched from the condenser 20 and connected to a suction side of the first compressor 11 located upstream in a refrigerant direction, a second evaporator 32 branched from the condenser 20 along with the first evaporator 31 and connected between a discharge side of the first compressor 11 and a suction side of the second compressor 12, a refrigerant switching valve 40 provided at a position branched from the outlet side of the condenser 20 to the first evaporator 31 and second evaporator 32 to control the flow direction of the refrigerant, and a controller configured to operate the first and second compressors 11, 12.

Referring to FIG. 1, the refrigerator 700 may include a main board 710 provided therein for controlling overall operation of the refrigerator, and connected to the first and second compressors 11, 12. The compressor control apparatus may be provided in the main board 710. The refrigerator 700 may be operated by driving the first and second compressors 11, 12. Cool air supplied to an inner portion of the refrigerator 700 may be generated by heat exchange with refrigerant, and continuously supplied to an inner portion of the refrigerator 700 while repeatedly performing compression-condensation-expansion-evaporation cycles. The supplied refrigerant may be uniformly transferred to an inner portion of the refrigerator 700 by convection, items within the refrigerator 700 to be stored at a desired temperature.

A machine chamber may be provided at a lower side of the refrigerator body, and the first and second compressors 11, 12 and condenser 20 of the freezing cycle apparatus may be provided in the machine chamber. The two compressors 11, 12 may be connected to each other in series. In other words, a discharge port of the first compressor 11 may be connected to a suction port of the condenser 20 such that refrigerant undergoing primary compression in the first compressor 11 undergoes secondary compression in the second compressor 12. The discharge port of the second compressor 12 is connected to an inlet port of the condenser 20. The first compressor 11 and second compressor 12 may have substantially the same capacity. However, in many instances, operation of the freezing chamber is frequently carried out, and thus in certain embodiments the capacity of the second compressor 12 may be greater than, for example, twice greater, than that of the first compressor 11.

The first and second evaporators 31, 32 may be provided on a first branch pipe and a second branch pipe from an outlet port of the condenser 20 and connected to each other in parallel. The refrigerant switching valve 40 may be provided at a junction the first branch pipe and second branch pipe, and a first expansion apparatus 51 and a second expansion apparatus 52 for expanding refrigerant may be provided at each branch pipe, namely, an inlet port end of each of the evaporators 31, 32. The refrigerant switching valve 40 may be a 3-way valve. For example, the refrigerant switching valve 40 may be formed such that an outlet port of the condenser 20 and either one of the evaporators 31, 32 are selectively communicated, or both evaporators 31, 32 are communicated at the same time.

Figure 3:
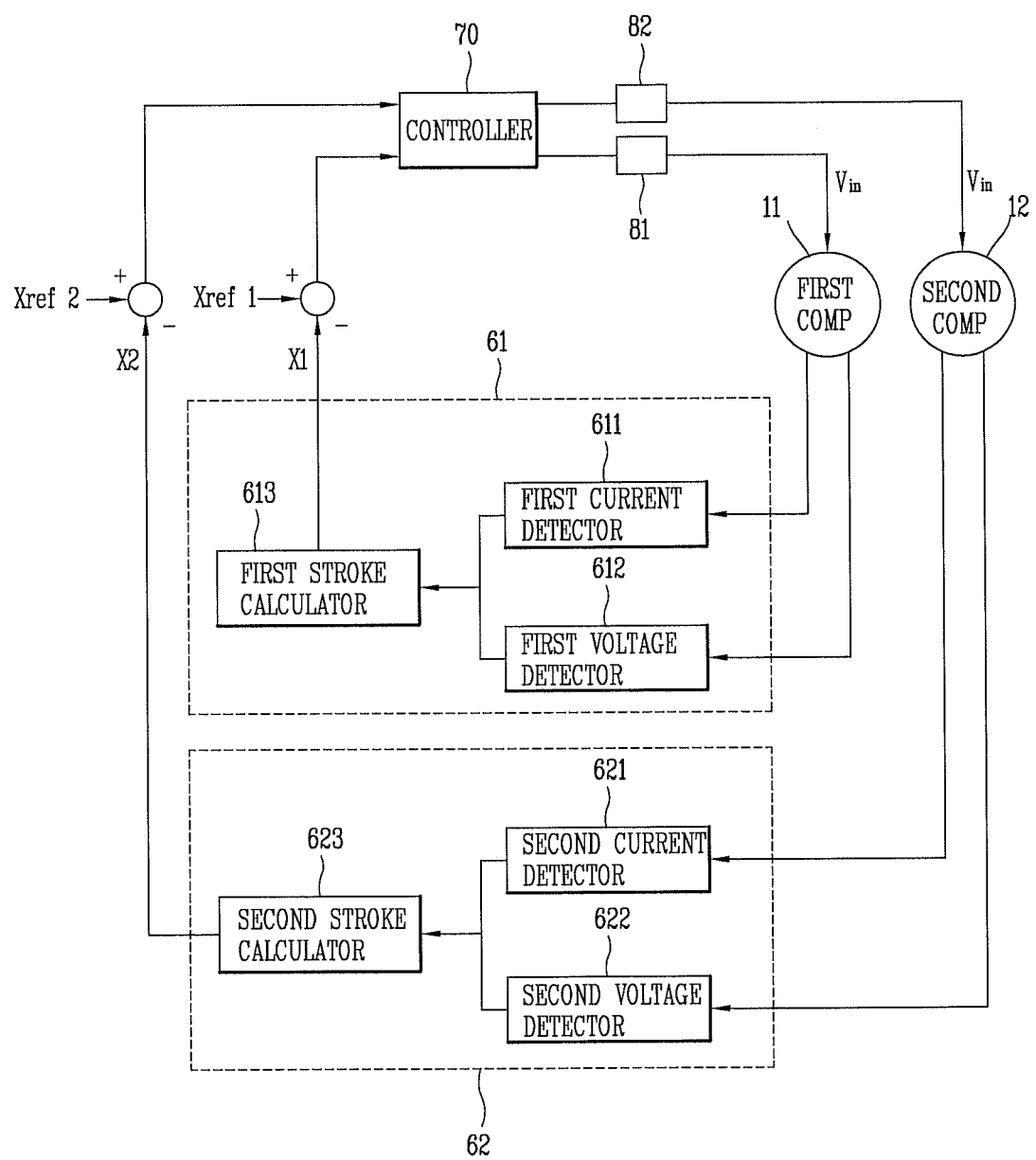
FIGS. 3 and 4 are schematic views of a compressor control apparatus using an inverter according to embodiments as broadly described herein.
Figure 4:
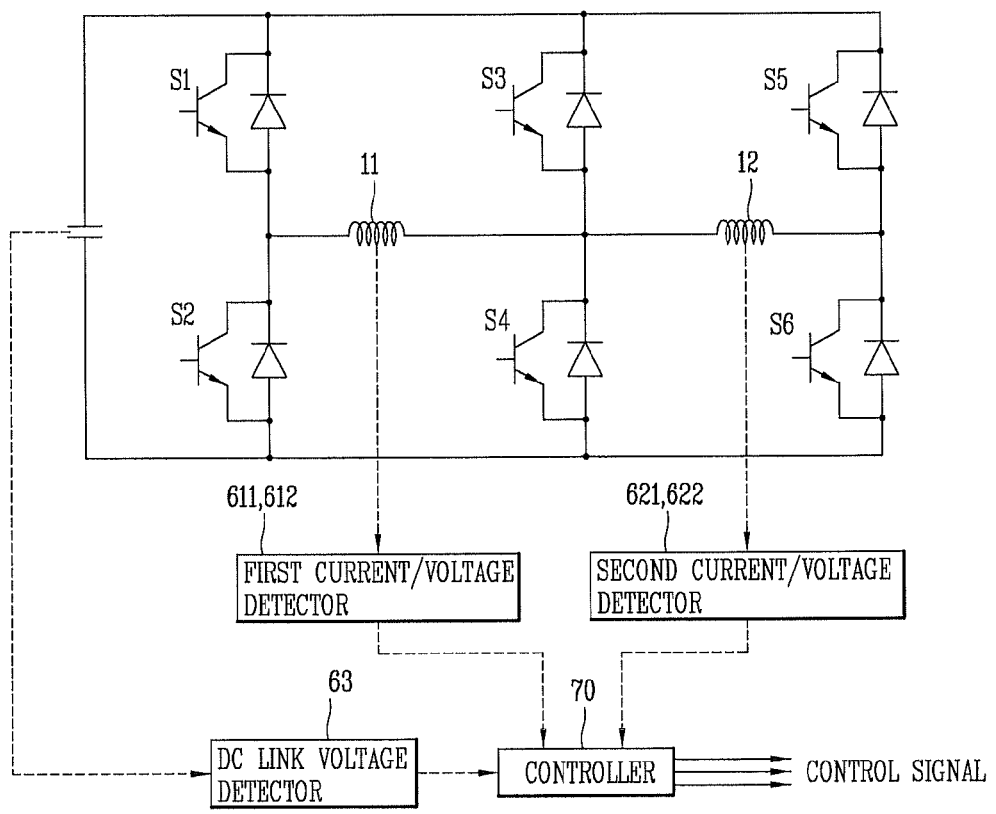
Figure 5:
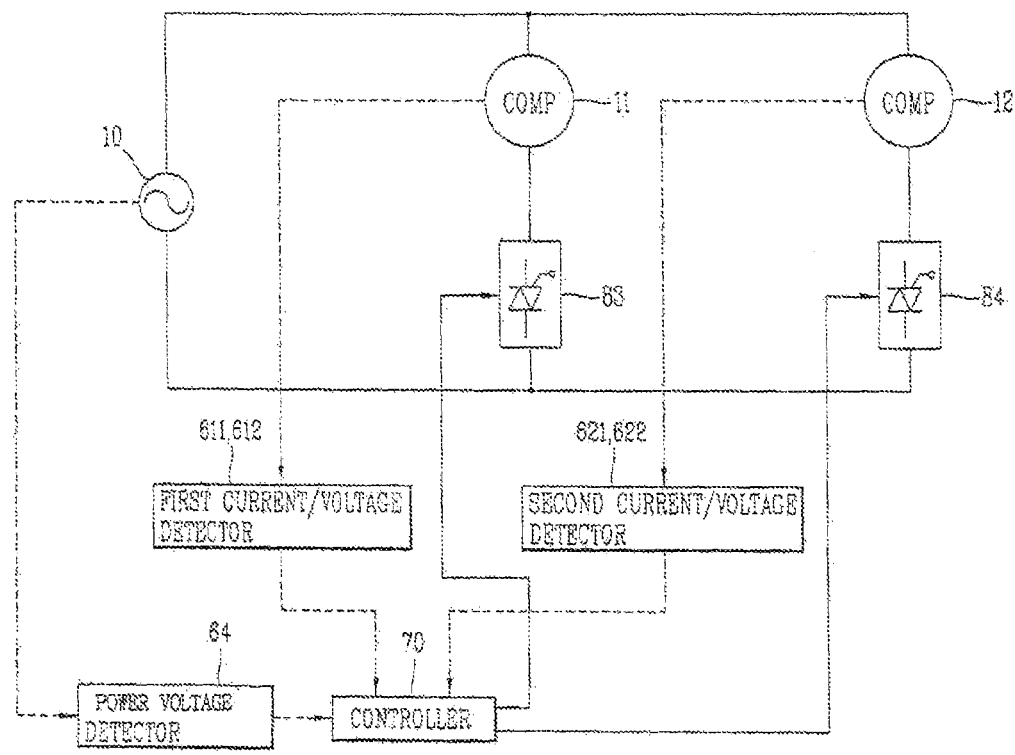
FIG. 5 is a schematic view of a compressor control apparatus using an alternating current switch.

Referring to FIGS. 3 through 5, a compressor control apparatus for controlling a first compressor and a second compressor connected to each other to compress refrigerant in two stages according to an embodiment as broadly described herein may include a controller 70 configured to generate a first control signal and a second control signal based on a load of the first compressor and a load of the second compressor to operate the first and second compressors. In this arrangement, the controller 70 first starts the second compressor 12, and then starts the first compressor 11 after a predetermined period of time has elapsed when the first and second compressors 11, 12 are to be operated together. The predetermined period of time may be determined based on a time required to achieve normal operation after the compressor is started, and may be determined in advance, such as, for example, 30 seconds. The predetermined period of time may be also determined after a top dead center detection time.

In certain embodiments, at least one of the first compressor 11 or the second compressor 12 may be a reciprocating compressor, particularly, a linear compressor. Furthermore, the two compressors 11, 12 may have different capacities. The first and second compressors 11, 12 may be operated in a simultaneous manner, or operated in a separate manner, by a compressor control apparatus having two alternating current switches. A compressor operation mode may be an operation mode determined by a load or required freezing capacity of the first and second compressors 11, 12. The compressor operation mode may control stroke, frequency or the like of each compressor by dividing it into a predetermined value. The compressor operation mode may include a separate operation mode of the first compressor 11, a separate operation mode of the second compressor 12, and a simultaneous operation mode of the first and second compressors 11, 12.

Figure 9:
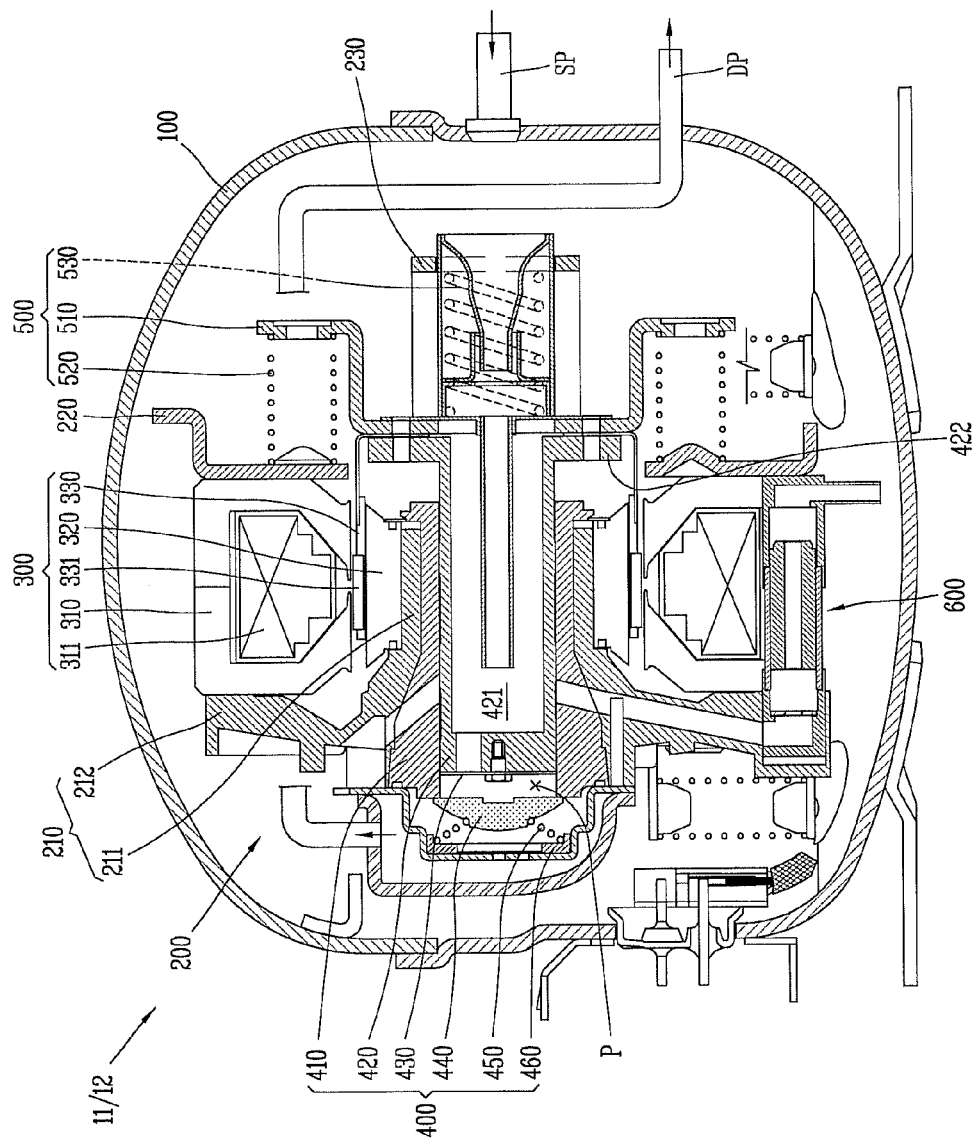
FIG. 9 is a cross-sectional view of an exemplary reciprocating compressor including a compressor control apparatus as embodied and broadly described herein.

Referring to FIG 9, each of the first compressor and the second compressor may include a casing 100 in communication with a gas suction pipe (SP) and a gas discharge pipe (DP), a frame 200 elastically supported by an inner portion of the casing 100, a motor 300 supported by die frame 200 to allow a mover 330 to perform a linear reciprocating movement, a compression unit 400 in which a piston 420 is coupled to the mover 330 of the motor 300 and supported by the frame 200, and a plurality of resonant units 500 for elastically supporting the mover 330 of the motor 300 and the piston 420 of the compression unit 400 in the movement direction to induce a resonant movement.

The frame 200 may include a first frame 210 supporting the compression unit 400 and a front side of the motor 300, a second frame 220 coupled to the first frame 210 to support a rear side of the motor 300, and a third frame 230 coupled to the second frame 220 to support a plurality of resonant springs 530. The first frame 210, second frame 220, and third frame 230 may be all formed of a non-magnetic, such as aluminum, to reduce core loss.

The first frame 210 may include a frame portion 211 having an annular plate shape, and a cylinder portion 212 having a cylindrical shape into which a cylinder 410 is inserted, formed on a rear surface, namely, lengthwise as an integral body in the motor direction, at the center of the frame portion 211. The frame portion 211 may be formed such that the outer diameter of the frame portion 211 is greater than or equal to the inner diameter of an outer stator 310 of the motor 300 to support both an outer stator 310 and an inner stator 320 of the motor 300.

The first frame 210 may be fixed such that the inner stator 320 is inserted into an outer circumferential surface of the cylinder portion 212. In this case, the first frame 210 may be formed of a non-magnetic material, such as aluminum, to reduce magnetic loss. Furthermore, the cylinder portion 212 may be formed on the cylinder 410 as an integral body using an insert die casting method. In certain embodiments, the cylinder portion 212 may be screw-assembled such that the cylinder 410 is pressurized or a screw thread is formed at an inner circumferential surface thereof. Furthermore, to improve stability of the cylinder 410, a step surface or inclined surface may be formed between a front side inner circumferential surface and a rear side inner circumferential surface of the cylinder portion 212, thereby allowing the cylinder 410 coupled to an inner circumferential surface of the cylinder portion 212 to be supported in the piston direction.

The motor 300 may include the outer stator 310 supported between the first frame 210 and second frame 220, a coil 311, the inner stator 320 coupled to an inner side of the outer stator 310 at a predetermined interval and inserted into the cylinder portion 212, and the mover 330 in which a magnet 331 is provided to correspond to the coil 311 of the outer stator 310 to perform a linear reciprocating movement along the magnetic flux direction between the outer stator 310 and inner stator 320. The outer stator 310 and inner stator 320 may be formed by laminating a plurality of thin stator core sheets in a cylindrical shape for each sheet or laminating plurality of thin stator core sheets in block shape and laminating the stator block in a radial.

The compression unit 400 may include the cylinder 410 formed on the first frame as an integral body, the piston 420 coupled to the mover 330 of the motor 300 to perform a reciprocating movement in the compression space P of the cylinder 410, a suction valve 430 mounted at a front end of the piston 420 to control the suction of refrigerant gas while opening or closing a suction passage 421 of the piston 420, a discharge valve 440 mounted at a discharge side of the cylinder 410 to control the suction of the compression gas while opening or closing the compression space P of the cylinder 410, a valve spring 450 elastically supporting the discharge valve 440, and a discharge cover 460 fixed to the first frame 210 at a discharge side of the cylinder 410 to accommodate the discharge valve 440 and valve spring 450.

The cylinder 410 may be formed in a cylindrical shape and may be inserted into and coupled to the cylinder portion 212 of the first frame.

The cylinder 410 may be formed of a material having a hardness greater than that of, for example, cast iron, or at least that of the first frame 210, in particular, that of the cylinder portion 212 taking into consideration of abrasion due to forming a bearing surface with the piston 420, an inner circumferential surface of which may be made of cast iron.

The piston 420 may be formed of the same material as the cylinder 410, or may be formed of a material having a hardness similar to that of the cylinder 410 to reduce abrasion due to contact with the cylinder 410. Furthermore, the suction passage 421 may penetrate into the piston 420 such that refrigerant is drawn into the compression chamber P of the cylinder 410.

The resonant unit 500 may include a spring supporter 510 coupled to a connecting portion between the mover 330 and the piston 420, first resonant springs 520 supported at a front side of the spring supporter 510, and second resonant springs 530 supported at a rear side of the spring supporter 510.

The compressor may also include a piston connecting portion 422 and an oil feeder 600.

When power is applied to the motor 300 and a magnetic flux is formed between the outer stator 310 and inner stator 320, the mover 330 positioned at a gap between the outer stator 310 and inner stator 320 continuously performs a reciprocating movement due to the resonant unit 500 while moving along the direction of the magnetic flux. When the piston 420 performs a backward movement within the cylinder 410, refrigerant filled in an inner space of the casing 100 passes through the suction passage 421 of the piston 420 and the suction valve 430 and is drawn into the compression space P of the cylinder 410. When the piston 420 performs a forward movement within the cylinder 410, refrigerant gas drawn into the compression space P is compressed to repeat a series of discharge processes while opening the discharge valve 440.

Reciprocating compressors may be widely used in various different types of appliances, such as, for example, a refrigerator or an air conditioner. When the first and second compressors are applied to a refrigerator as illustrated in FIG. 1, it may be designed such that one compressor takes charge of the refrigerating chamber and the other compressor takes charge of the freezing chamber.

A compressor control apparatus for controlling a first compressor 11 and a second compressor 12 connected to each other to compress refrigerant in two stages according to another embodiment may include a controller 70 configured to generate a first control signal and a second control signal based on a load of the first compressor 11 and the second compressor 12 to operate the first and second compressors 11, 12. The controller 70 may first start the second compressor 12 and detect a top dead center of the second compressor 12, and then start the first compressor.

Referring to FIGS. 3 through 5, the compressor control apparatus may also include a first load detector 61 and a second load detector 62 configured to detect a load of the first compressor 11 and the second compressor 12. The controller 70 generates a control signal controlling an inverter or alternating current (AC) switch based on the load. In other words, the controller 70 generates a first control signal and a second control signal based on the load of the first and second compressors 11, 12 to operate the first and second compressors 11, 12 in a separate or simultaneous manner. The controller 70 generates first and second control signals using a first stroke and a second stroke of the first and second compressors 11, 12, and stroke instruction values for the first and second compressors 11, 12. The load of the compressor may include a motor current, a motor voltage, a stroke, their phase difference, a frequency, and the like. For example, when a compressor is provided in a refrigerator, the load of the compressor may be detected using a load of the refrigerator.

The compressor control apparatus may also include a first current detector 611 and a second current detector 621 configured to detect a first motor drive current and a second motor drive current applied to a first motor and a second motor of the first compressor 11 and the second compressor 12, respectively. The compressor control apparatus may also include a first voltage detector 612 and a second voltage detector 622 configured to detect a first motor drive voltage and a second motor drive voltage applied to the first and second motors.

The first and second current detectors 611, 621 detect a drive current applied to the compressor based on a load of the compressor or a load of the freezer. Each current detector detects a motor current applied to its respective compressor motor. The first and second voltage detectors 612, 622 detect a motor voltage applied to the compressor. Each voltage detector detects a motor voltage applied between two ends of the respective compressor motor based on a load of the compressor.

The compressor control apparatus may also include a first stroke calculator 613 and a second stroke calculator 623 configured to calculate a first stroke and second stroke of the first compressor 11 and the second compressor 12, respectively, using the first and second motor drive currents and the first and second motor drive voltages. The relationship among the motor voltage, motor current, and stroke is as follows. The first and second stroke calculators 613, 623 may calculate a stroke using the following equation based on a motor voltage detected through the first and second voltage detectors 612, 622, and a motor current detected through the first and second current detectors 611, 621.

$$x = \frac{1}{a} \int \left( Vm - Ri - L\frac{di}{dt} \right) dt \qquad \text{Equation 1}$$

In Equation 1, x is a stroke, α is a motor constant, Vm is a motor voltage, R is a resistance, L is an inductance, and i is a motor current.

The controller 70 receives a first stroke instruction value (xref1) and compares a first stroke estimate value (x1) calculated by the first stroke calculator 613 with the first stroke instruction value (xref1). The controller 70 compares the first stroke estimate value (x1) with the first stroke instruction value (xref1), and generates a control signal for controlling switching elements or an alternating current (AC) switch within the inverter based on the comparison result. In addition, the controller 70 receives a second stroke instruction value (xref2) and compares a second stroke estimate value (x2) calculated by the second stroke calculator 623 with the second stroke instruction value (xref2). The controller 70 compares the second stroke estimate value (x2) with the second stroke instruction value (xref2), and generates first and second control signals based on the comparison result. The compressor control apparatus may perform sensorless control, and the detailed description thereof will be omitted.

The first and second load detectors 61, 62 may detect a load on the first compressor 11 and the second compressor 12, respectively, using the motor drive current, the motor drive voltage, or the first and the second stroke. The controller 70 independently operates the first compressor 11 and the second compressor 12 based on the load on the first compressor 11 and the second compressor 12 detected by the first load detector 61 and the second load detector 62.

The size of the compressor load may be detected using a phase difference between the motor current and stroke estimate value, and a phase difference between the motor voltage and stroke estimate value. Furthermore, the size of the compressor load may be detected using a gas spring constant Kg. In addition, the size of the compressor load may be detected using a gas damping constant Cg.

The controller 70 may detect a top dead center based on an inflection point of the gas spring constant Kg of the second compressor 12 or an inflection point of the phase difference between the motor drive current and stroke. The top dead center physically denotes a stroke at the compression cycle completion of a piston, and is a position where the top clearance volume (TCV) or top dead center (TDC) becomes zero.

In certain embodiments, the controller 70 may include a gas spring constant calculator configured to calculate a gas spring constant of the first and second compressors 11, 12 and a top dead center detector configured to detect the top dead center using an inflection point of the gas spring constant Kg.

In certain embodiments, the controller 70 may further include a phase difference detector configured to detect a phase difference between the motor drive currents and the strokes and a top dead center detector configured to detect the top dead center using an inflection point of the phase difference.

The piston within the compressor is provided with various springs so that it is elastically supported in the movement direction even when the piston performs a linear reciprocating movement by the compressor motor. Specifically, a coil spring, which is a type of mechanical spring, may be elastically supported by the airtight container and cylinder in the movement direction of the piston. In addition, refrigerant drawn into the compression space may also function as a gas spring. The coil spring may have a predetermined mechanical spring constant Km and the gas spring may have a gas spring constant Kg that varies based on the load. A natural frequency fn of the linear compressor may be determined taking into consideration the mechanical spring constant Km and gas spring constant Kg. A relationship among the natural frequency fn, and mechanical and gas spring constants Km and Kg is as follows.

$$f_n = \frac{1}{2\pi}\sqrt{\frac{K_m + K_g}{M}} \qquad \text{Equation 2}$$

In Equation 2, fn is a natural frequency of the piston, Km is a mechanical spring constant, Kg is a gas spring constant, and M is a mass of the piston.

The gas spring constant Kg may be calculated using the following equation based on the motor current and stroke estimate value.

$$K_g = a\left|\frac{I(j\omega)}{X(j\omega)}\right|\cos(\theta_{i,x}) + Mw^2 - K_m \qquad \text{Equation 3}$$

In Equation 3, α is a motor constant, ω is an operating frequency, Km is a mechanical spring constant, Kg is a gas spring constant, M is a mass of the piston, |I(jω)| is a current peak value for one period, and |X(jω)| is a stroke peak value for one period.

Figure 6:
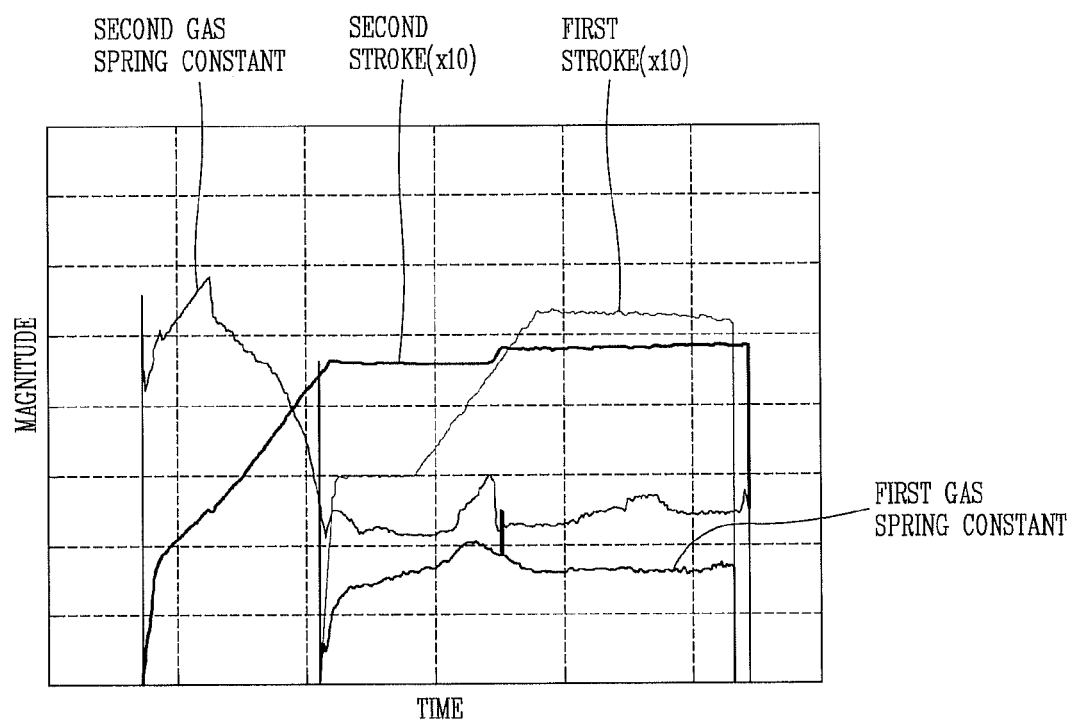
FIG. 6 is a graph of a change in gas spring constant and stroke according to embodiments as broadly described herein.
Figure 10:
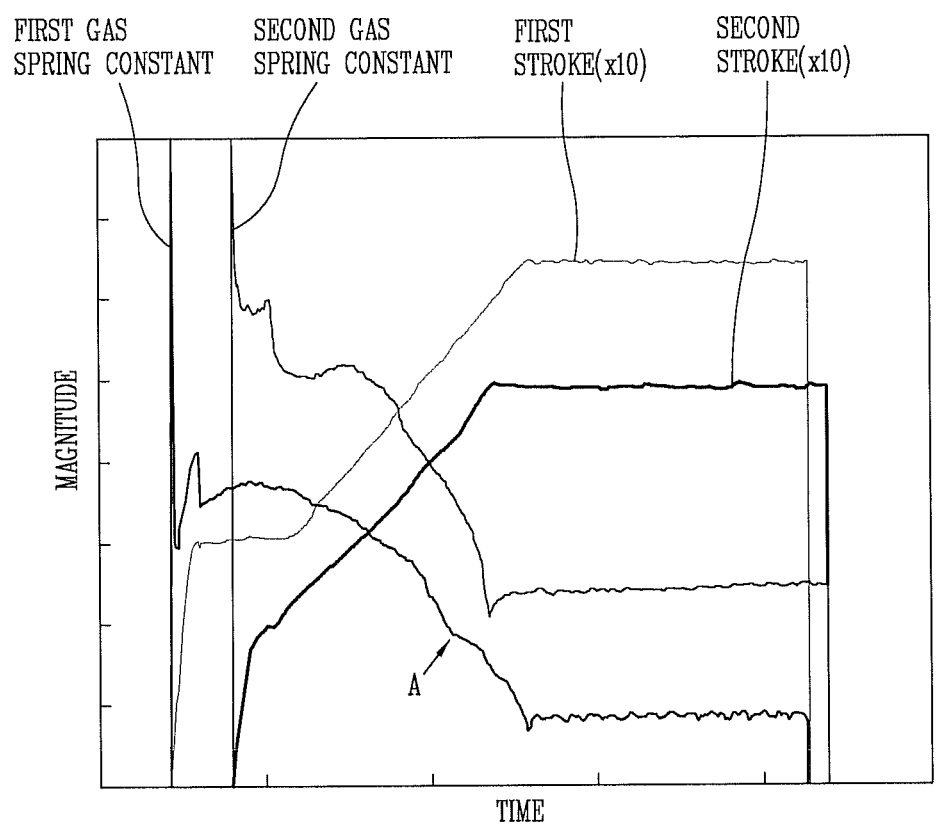
FIG. 10 is a graph of exemplary changes in gas spring constant and stroke over time.

FIG. 6 illustrates a method in which the second compressor 12 is started first, and then the first compressor 11 is started, to operate the first and second compressors 11, 12 according to embodiments as broadly described herein. When the second compressor 12 is started, the second gas spring constant gradually decreases from a relatively large value, and the second stroke gradually increases. At this time, the compressor control apparatus controls the second compressor 12 to be constant with a second stroke at an inflection point of the second gas spring constant, thereby performing "full stroke control" or "top dead center control". Similarly, the compressor control apparatus operates the first compressor 11 to be constant with a first stroke at an inflection point of the first gas spring constant. On the contrary, referring to FIG. 10, in an arrangement in which the first compressor 11 is started first, and then the second compressor 12 is started, the first stroke is increased even subsequent to the inflection point (position "A") of the first gas spring constant. In other words, a discharge pressure of the first compressor 11 is affected by a suction pressure of the second compressor 12 due to the start-up of the second compressor 12, and thus the inflection point of the first gas spring constant does not occur or the compressor control apparatus cannot detect the inflection point of the first gas spring constant. Accordingly, the first compressor may be operated in an over stroke condition.

Referring to FIGS. 3 and 4, the compressor control apparatus may include a converter configured to rectify commercial alternating current power to direct current power, a smoothing unit configured to smoothen and store the rectified direct current power, a first inverter 81 configured to perform switching based on the first control signal to convert the smoothened direct current power into drive power for the first compressor 11 so as to apply the drive power to the first compressor 11, and a second inverter 82 configured to perform switching based on the second control signal to convert the smoothened direct current power into drive power for the second compressor 12 so as to apply the drive power to the second compressor 12.

The converter may include a plurality of diodes or a plurality of diodes and switching elements. In certain embodiments, the converter may include a full-bridge diode to rectify commercial alternating current (AC) power and output the rectified power to the smoothing unit. The first and second inverters 81, 82 may include a plurality of switching elements to start and operate the first and second compressors 11, 12 based on the first and second control signals generated by the controller 70. Referring to FIG. 4, the first and second inverters 81, 82 may be configured as a single inverter. The first and second control signals are mostly pulse width modulation (PWM) signals such as space vector pulse width modulation (SVPWM) or the like. The controller 70 may further include a direct current (DC) link voltage detector 63 for detecting a direct current (DC) link voltage stored in the smoothing unit, and may generate the first and second control signals using the direct current (DC) link voltage along with the motor drive voltage and current.

Referring to FIG. 5, the compressor control apparatus may include a first alternating current (AC) switch 83 and a second AC switch 84 configured to perform switching based on the first and second control signals to drive the first and second compressors 11, 12. The first and second alternating current (AC) switches 83, 84 are opened or closed to apply the motor drive voltage and motor drive current to compressor motors provided in the first and second compressors 11, 12. The alternating current (AC) switches 83, 84 may include a thyristor, a triac, or the like. The controller 70 varies a firing angle of the first AC switch 83 or second AC switch 84 based on the freezing capacity of the first compressor 11 and second compressor 12. In this case, the compressor control apparatus may further include a power voltage detector 64 configured to detect the power voltage of the commercial alternating current (AC) power, a zero voltage detector configured to detect the zero voltage of the power voltage, and a power frequency detection unit configured to detect the power frequency of the commercial alternating current (AC) power 10.

Figure 7:
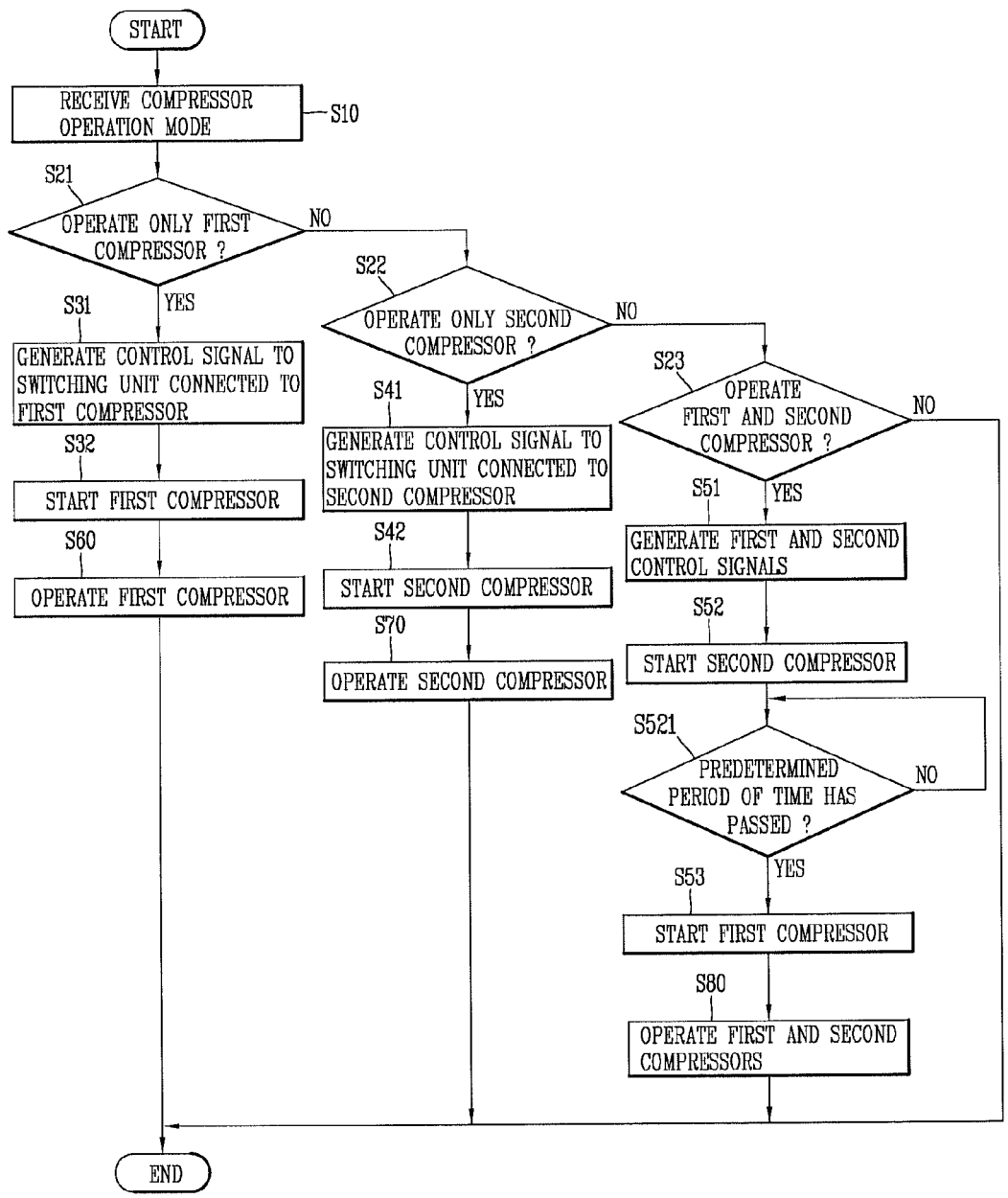
FIGS. 7 and 8 are flow charts of methods of operating a compressor control apparatus according to embodiments as broadly described herein.

Referring to FIG. 7, a compressor control method in an apparatus for controlling a first compressor and a second compressor connected to each other to compress refrigerant in two stages, in accordance with embodiments as broadly described herein, may include receiving a compressor operation mode (S10) and starting the first compressor and/or the second compressor based on the received compressor operation mode. When the first and second compressors are to be operated together (S23), the starting step first starts the second compressor (S52) and then starts the first compressor (S53) after a predetermined period of time has elapsed (S521).

Figure 8:
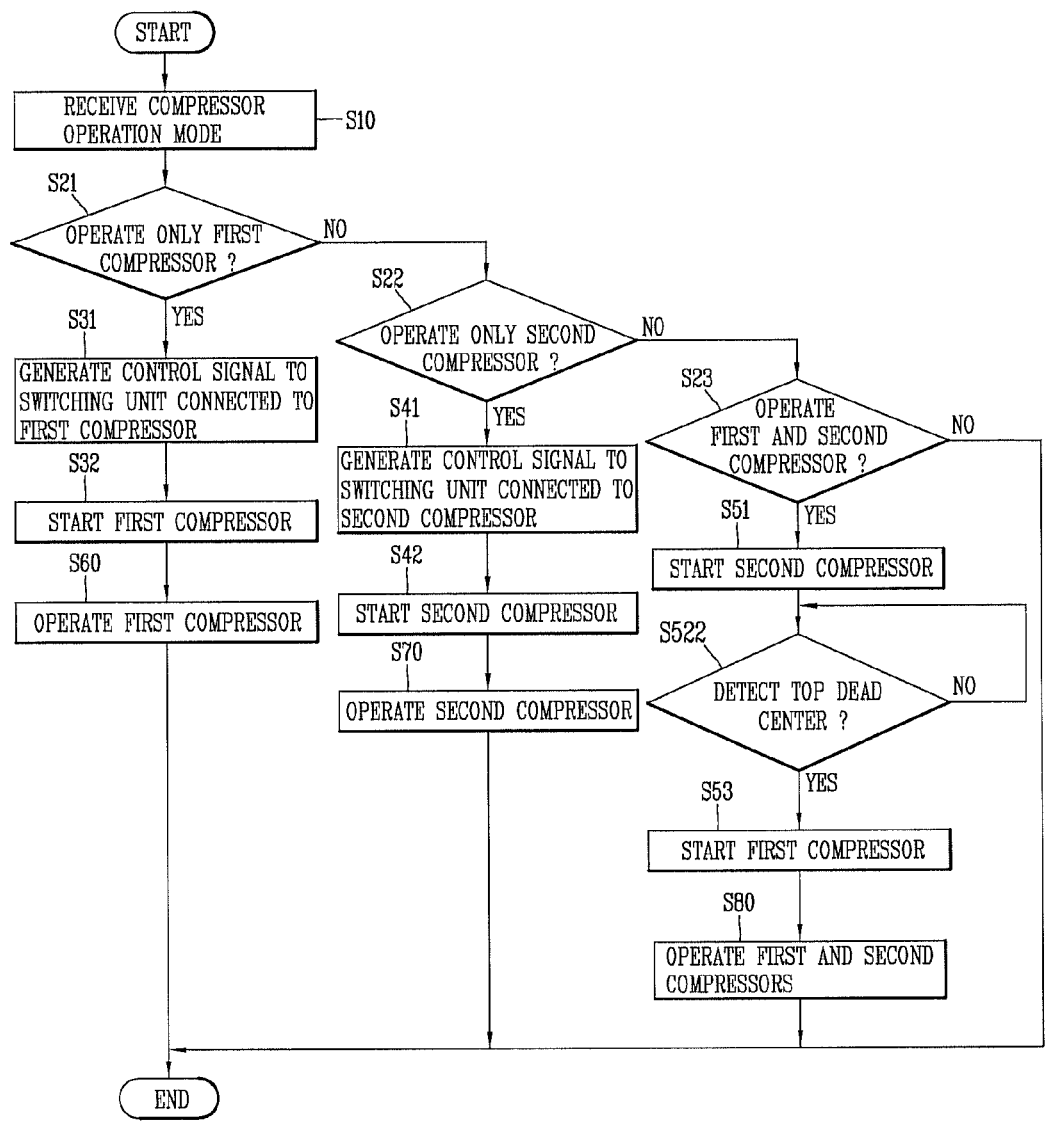

Referring to FIG. 8, a compressor control method in an apparatus for controlling a first compressor and a second compressor connected to each other to compress refrigerant in two stages according to another embodiment may include receiving a compressor operation mode (S10) and starting the first compressor and/or the second compressor based on the received compressor operation mode. When the first and second compressors are to be operated together (S23), the starting step first starts the second compressor (S51) and detects a top dead center of the second compressor (S522), and then starts the first compressor (S53).

More particularly, the starting step shown in FIG. 8 may include starting the second compressor when the compressor operation mode is a mode in which the first and second compressors are to be operated together, detecting a motor drive current and a motor drive voltage applied to a motor provided in the second compressor, calculating a gas spring constant of the first and second compressors, detecting the top dead center using an inflection point of the gas spring constant, and starting the first compressor when the top dead center is detected.

Furthermore, the starting step shown in FIG. 8 may include starting the second compressor when the compressor operation mode is a mode in which the first and second compressors are to be operated together, detecting a motor drive current and a motor drive voltage applied to a motor provided in the second compressor, calculating a stroke using the motor drive current and motor drive voltage, detecting a phase difference between the motor drive currents and the strokes, detecting the top dead center using an inflection point of the phase difference, and starting the first compressor when the top dead center is detected.

The first and second switching devices may be connected to the first and second compressors, and then the compressor control apparatus may receive a compressor operation mode (S10), and may determine whether to operate only the first compressor (S21, S31, S32, S60), operate only the second compressor (S22, S41, S42, S70), or operate both the first and second compressors in a simultaneous manner (S23, S51, S52, S521, S53, S80). The first and second switching devices may each be an inverter or triac.

Referring to FIG. 2, when operating the first compressor 11, the compressor control apparatus compares the first stroke instruction value (xref1) with the first stroke estimate value (x1), and generates a first control signal switching the first switching device based on the comparison result (S31). Furthermore, when operating the second compressor 12, the compressor control apparatus compares the second stroke instruction value (xref2) with the second stroke estimate value, and generates a second control signal switching the second switching device based on the comparison result (S41). When operating the first and second compressors in a simultaneous manner, the compressor control apparatus generates the first and second control signals to the first and the second switching devices, respectively.

As discussed above, the compressor control apparatus first starts the second compressor (S51) and then starts the first compressor after a predetermined period of time has elapsed (or after detecting an inflection point of the gas spring constant or an inflection point of the phase difference) (S53) and operates the first and second compressors (S80). When the second compressor is started, the second gas spring constant is gradually decreased from a relatively large value, and the second stroke is gradually increased. At this time, the compressor control apparatus controls the second compressor to be constant with a second stroke at an inflection point of the second gas spring constant, thereby performing so-called full stroke control or top dead center control. Similarly, the compressor control apparatus operates the first compressor to be constant with a first stroke at an inflection point of the first gas spring constant.

As described above, in a compressor control apparatus and method, and a refrigerator comprising the same, as embodied and broadly described herein in a refrigerator having two compressors, two compressors may be started, with a time difference between start times, thereby reducing an effect of the suction pressure and discharge pressure between the compressors to more stably operate the compressors, thereby improving reliability and power consumption of the compressor.

A compressor control apparatus and method is provided for minimizing an effect of suction pressure and discharge pressure between two mutual compressors in a refrigerator having two compressors.

A compressor control apparatus and method is provided for adjusting a start-up time of two compressors to reduce an effect of suction pressure and discharge pressure between two mutual compressors so as to allow the compressors to be stably operated in a refrigerator having two compressors.

A compressor control apparatus for controlling a first and a second compressor connected to each other to compress refrigerant in two stages, as embodied and broadly described herein, may include a control unit configured to generate a first and a second control signal based on a load of the first and the second compressor to operate the first and the second compressor, wherein the control unit first starts the second compressor, and starts the first compressor after a predetermined period of time has passed when the first and the second compressor are operated together.

A compressor control apparatus for controlling a first and a second compressor connected to each other to compress refrigerant in two stages, as embodied and broadly described herein, may include a control unit configured to generate a first and a second control signal based on a load of the first and the second compressor to operate the first and the second compressor, wherein the control unit first starts the second compressor and detects a top dead center of the second compressor and then starts the first compressor.

A compressor control method in an apparatus for controlling a first and a second compressor connected to each other to compress refrigerant in two stages, as embodied and broadly described herein, may include receiving a compressor operation mode, and starting the first and the second compressor according to the compressor operation mode, wherein said starting step first starts the second compressor, and starts the first compressor after a predetermined period of time has passed when the first and the second compressor are operated together.

A compressor control method in an apparatus for controlling a first and a second compressor connected to each other to compress refrigerant in two stages, as embodied and broadly described herein, may include receiving a compressor operation mode, and starting the first and the second compressor according to the compressor operation mode, wherein said starting step first starts the second compressor and detects a top dead center of the second compressor and then starts the first compressor when the first and the second compressor are operated together.

A refrigerator, as embodied and broadly described herein, may include a first and a second compressor connected to each other to compress refrigerant in two stages, a condenser connected to a discharge side of the second compressor located at a downstream side based on the flowing direction of the refrigerant, a first evaporator branched from the condenser and connected to a suction side of the first compressor located at an upstream based on the flowing direction of the refrigerant, a second evaporator branched from the condenser along with the first evaporator and connected between a discharge side of the first compressor and a suction side of the second compressor, a refrigerant switching valve provided at a position branched from the outlet side of the condenser to the first evaporator and second evaporator to control the flowing direction of the refrigerant, and a control unit configured to first start the second compressor, and start the first compressor after a predetermined period of time has passed when the first and the second compressor are operated together. For another example, the control unit may first start the second compressor and detect a top dead center of the second compressor and then start the first compressor.

In a refrigerator having two compressors, as embodied and broadly described herein, the start-up times of the two compressors may be controlled, thereby reducing an effect of the suction pressure and discharge pressure between mutual compressors.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor control apparatus for controlling a first compressor and a second compressor connected to each other to compress a refrigerant in two stages, the apparatus comprising:
    a controller configured to generate a first control signal and a second control signal based on a load of the first compressor and the second compressor, respectively, and transmit the generated first control signal and the second control signal to operate the first compressor and the second compressor, respectively, wherein the first compressor and the second compressor are operated independently by the controller, wherein the controller is configured to first start the second compressor, and to start the first compressor after a predetermined period of time has elapsed after starting the second compressor in a simultaneous operation mode in which the first and second compressors are operated together, wherein the controller detects a top dead center of the second compressor after the second compressor is started, and wherein the controller starts the first compressor after the top dead center of the second compressor is detected.

2. The apparatus of claim 1, further including:
    a first load detector and a second load detector configured to detect a load of the first and second compressors, respectively.

3. The apparatus of claim 2, wherein the first load detector includes:
    a first current detector configured to detect a first motor drive current applied to a first motor provided in the first compressor;
    a first voltage detector configured to detect a first motor drive voltage applied to the first motor; and
    a first stroke calculator configured to calculate a first stroke of the first compressor using the first motor drive current and the first motor drive voltage, and wherein the second load detector includes:
        a second current detector configured to detect a second motor drive current applied to a second motor provided in the second compressor;
        a second voltage detector configured to detect a second motor drive voltage applied to the second motor; and
        a second stroke calculator configured to calculate a second stroke of the second compressor using the second motor drive current and the second motor drive voltage.

4. The apparatus of claim 3, wherein the controller includes:
a gas spring constant calculator configured to calculate a gas spring constant of the first and second compressors, respectively; and
a top dead center detector configured to detect the top dead center using an inflection paint of the gas spring constant.

5. The apparatus of claim 3, wherein the controller includes:
a phase difference detector configured to detect a phase difference between the first and second motor drive currents and the first and second strokes, respectively; and
a top dead center detector configured to detect the top dead center using an inflection point of the phase difference.

6. The apparatus of claim 1, wherein the first and second compressors are reciprocating compressors.

7. The apparatus of claim 6, further including:
a converter configured to rectify commercial alternating current power to direct current power;
a smoothing device configured to smoothen and store the rectified direct current power;
a first inverter configured to perform switching in response to the first control signal to convert the smoothened direct current power into drive power for the first compressor to apply the drive power to the first compressor; and
a second inverter configured to perform switching in response to the second control signal to convert the smoothened direct current power into drive power for the second compressor to apply the drive power to the second compressor.

8. The apparatus of claim 6, further including:
a first alternating current switch and a second alternating current switch configured to perform switching in response to the first and second control signals to drive the first and second compressors, respectively.

9. The apparatus of claim 1, wherein the first and second compressors are reciprocating compressors having a brushless direct current motor.

10. A refrigerator, comprising:
first and second compressors connected to each other to compress a refrigerant in two stages;
a condenser connected to a discharge side of the second compressor, downstream of the second compressor in a refrigerant flow direction;
a first evaporator branched from, the condenser and connected to a suction side of the first compressor, upstream of the first compressor in the refrigerant flow direction;
a second, evaporator branched from the condenser along with the first evaporator and connected between a discharge side of the first compressor and a suction side of the second compressor;
a refrigerant switching valve provided at a position branched from an outlet side of the condenser to the first evaporator and the second evaporator to control the refrigerant flow direction; and
a controller configured to operate the first compressor and the second compressor independently, first start the second compressor, and start the first compressor after starting the second compressor when the first and second compressors are to be operated together, wherein the controller detects a top dead center of the second compressor after the second compressor is started, and wherein the controller starts the first compressor after the top dead center of the second compressor is detected.

11. The refrigerator of claim 10, wherein the controller is configured to detect the top dead center based on an inflection point of a gas spring constant of the second compressor or an inflection point of a phase difference between a corresponding motor drive current and stroke.

12. The refrigerator of claim 10, wherein the discharge side of the first compressor is connected to the suction side of the second compressor.

13. The refrigerator of claim 10, further including a first expander and a second expander to expand the refrigerant provided between the refrigerant switching valve and the first evaporator and the second evaporator, respectively.

14. The refrigerator of claim 13, wherein an inlet side and an outlet side of the first expander are connected to an outlet side of the refrigerant switching valve and an inlet side of the first evaporator, respectively, and wherein an inlet side and an outlet side of the second expander are connected to the other outlet side of the refrigerant switching valve and an inlet side of the second evaporator, respectively.

15. The refrigerator of claim 10, wherein the refrigerant switching valve is a 3-way valve configured to communicate the outlet side of the condenser selectively with one of the first evaporator or the second evaporator, or with the first evaporator and the second evaporator simultaneously.

16. The apparatus of claim 7, further including a DC link voltage detector that detects a DC link voltage stored in the smoothing device, wherein the controller generates the first control signal and the second control signal using the detected DC link voltage.

17. The apparatus of claim 8, further including, a power voltage detector that detects a power voltage of commercial AC power, wherein the controller generates the first control signal and the second control signal using the detected power voltage.

* * * * *